W. WILSON.
MOTOR VEHICLE DRIVING MECHANISM.
APPLICATION FILED JULY 7, 1917.
1,274,650.
Patented Aug. 6, 1918.
2 SHEETS—SHEET 1.
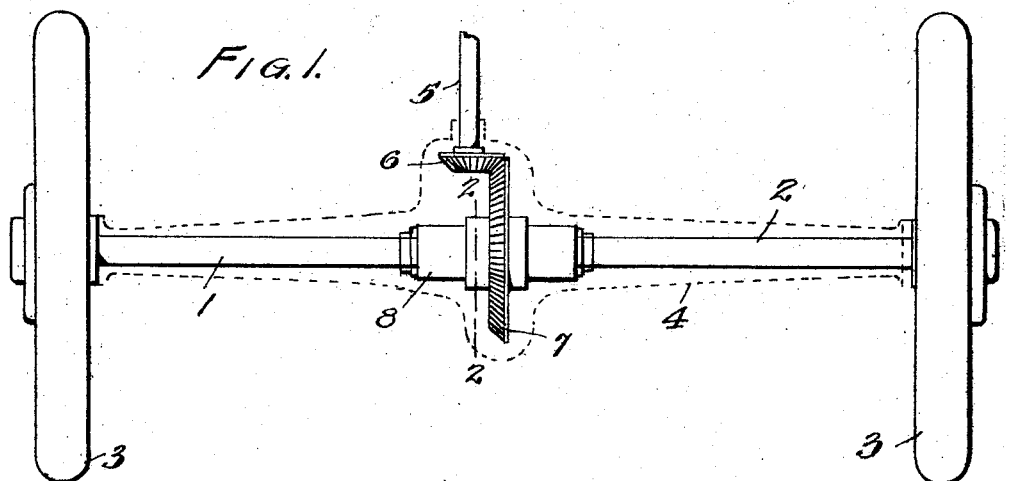
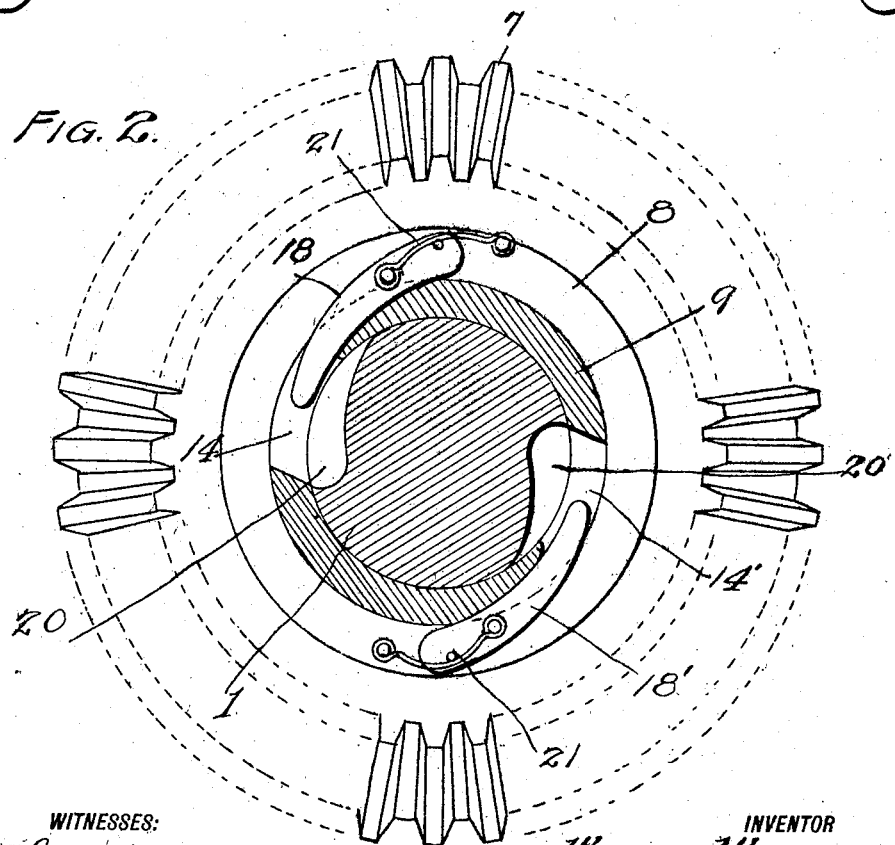
WITNESSES:
Chas. K. Davies
INVENTOR
WILLIAM WILSON.
BY
Thomas H. Harney
ATTORNEY W. WILSON.
MOTOR VEHICLE DRIVING MECHANISM.
APPLICATION FILED JULY 7, 1917.
1,274,650.
Patented Aug. 6, 1918.
2 SHEETS—SHEET 2.
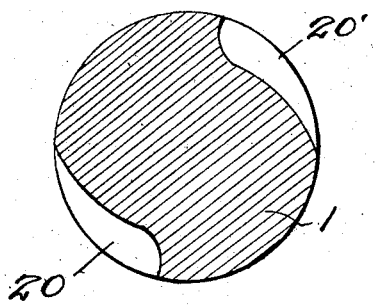
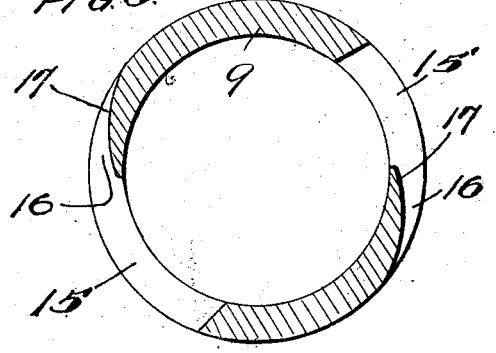
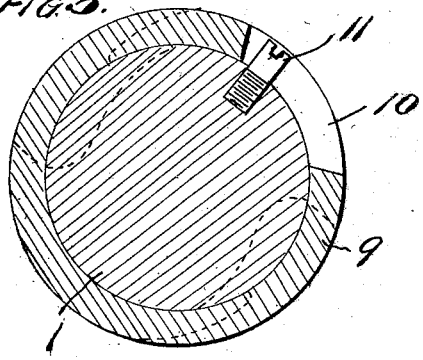
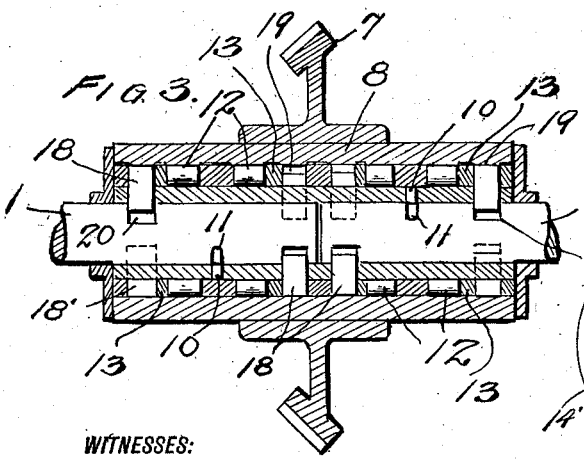
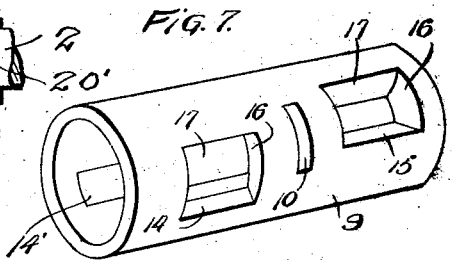
WITNESSES:
C. K. Davis
INVENTOR
WILLIAM WILSON
BY Thomas H. Farmer
ATTORNEY

UNITED STATES PATENT OFFICE.

WILLIAM WILSON, OF MARIETTA, GEORGIA.

MOTOR-VEHICLE DRIVING MECHANISM.

1,274,650.  Specification of Letters Patent.  Patented Aug. 6, 1918.

Application filed July 7, 1917. Serial No. 179,107.

*To all whom it may concern:*

Be it known that I, WILLIAM WILSON, a citizen of the United States of America, residing at Marietta, in the county of Cobb and State of Georgia, have invented certain new and useful Improvements in Motor-Vehicle Driving Mechanism, of which the following is a specification.

The present invention relates to improvements in motor vehicles, and particularly to an improved and simplified differential clutch, applicable for use either at the junction of the sections of a sectional rear driving axle, or for coupling the axle ends with the hub of the traction or driving wheels on the axle ends. In the accompanying drawings I have illustrated these two applications of my invention coupled with a two-piece axle and coupling a single piece axle with its two traction wheels, but it will be understood that other uses may be found for the embodiment of my invention.

Figure 1 is a top plan view of a two-piece rear axle and driving wheels with my invention applied to the junction of the axle.

Fig. 2 is an enlarged transverse sectional view on line 2—2 of Fig. 1.

Fig. 3 is a longitudinal sectional view of the axle coupling.

Fig. 4 is a sectional detail of one of the axle sections showing the recesses or ratchet sockets therein.

Fig. 5 is a sectional detail showing the screw for limiting the movement of the sleeve with relation to its axle.

Fig. 6 is a sectional view of the sleeve.

Fig. 7 is a perspective view of a modified form of sleeve of the coupling or clutch for application to a wheel hub.

In order to clearly illustrate my invention I have utilized the rear driving axle of a motor vehicle, the two parts being indicated by the numerals 1 and 2, the wheels designated as 3, 3, and the transmission casing being indicated in dotted lines as 4.

The usual longitudinal driving shaft 5 with its bevel pinion 6 meshes with the bevel gear 7 forming the transmission gearing. The gear 7 has an elongated hub 8 inclosing the two ends of the axle sections and between these ends and the hub are interposed clutch members so that in turning a curve for instance, the outer wheel may travel faster than the inner wheel, and the inner wheel will have the greater tractive power for propelling the vehicle.

Between the hub of the gear wheel and the axle ends is interposed a sleeve 9 which I shall designate a friction sleeve, which is loose on the axle ends but has only a limited movement thereon. The sleeve is fashioned with a pair of circumferential slots 10, 10, adapted to co-act with the pins or screws 11, 11, in the respective ends of the axle sections, and these pins and slots, as will readily be seen, permit a limited rotation of the sleeve on the axle ends, and permit independent movement of the axle ends in the sleeve.

Between the hub and the friction sleeve are interposed series of ball or roller bearings as 12, 12, 12, 12, so that the hub may revolve more freely on the sleeve than does the sleeve on the axle ends; in other words, the friction between the sleeve and axle ends is greater than that between the hub and the sleeve. For convenience of construction, I have utilized a series of rings or washers 13, between the hub and the sleeve all of which revolve with the hub, and, as indicated, are keyed thereto.

The friction sleeve is fashioned with four slots spaced in diametrically arranged pairs as 14, 14' and 15, 15' each open slot having a closed portion 16 with a rounded face 17 which merges with the outer periphery of the sleeve, and these slots are designed to perform the functions of ratchets in connection with the pawls 18, 18' that have their outer ends seated in sockets 19, 19' in the hub and are adapted to extend through the slots and engage against the walls of the sockets 20, 20' cut in the periphery of the axles.

There are two sets of these pawls, *i. e.*, two pairs at each side of the center of the hub, so that a pair is designed to drive each axle end forward and another reverse, and as shown in Fig. 3, the two sets of roller bearings are located between the pawls or clutches to each axle end.

Springs 21 may be utilized to hold the pawls from dropping when not supported by the sleeve. In Fig. 2, the parts are shown in position about to turn a corner when the outer wheel will travel faster than the inner wheel, and inasmuch as the gear wheel cannot revolve faster than the inner wheel, the outer wheel will consequently revolve its axle faster than the axle of the inner wheel and of the hub of the gear wheel through which the power is transmitted. Then, at that point the axle 1 will move ahead (turning clockwise in Fig. 2) leaving the pawls, and the friction of the sleeve on the axle being greater than that between the hub and sleeve, and with the help of the springs which hold the pawls in their proper positions, the axle revolves with its wheel and faster than the inner axle and its wheel or gear wheel. But as soon as the travel of the machine is again in a straight line, the pawls will again begin to transmit power from the hub through the sleeve and to the axle. This same movement takes place at either side of the axle center, and whether the car is traveling forward or backward, through the action of the two sets of pawls.

What I claim is:—

1. The combination with a driving axle and a friction sleeve having a limited movement thereon and formed with diametrically arranged openings having tangential guide faces, of a hub, and oppositely disposed pawls interposed between the hub and axle for engagement with said guide faces.

2. The combination with a two piece driving axle, a single driving wheel and an elongated hub inclosing the adjoining ends of said axle pieces, of a friction sleeve on the axle ends and having a limited movement thereon, said sleeve provided with diametrically arranged slots formed with tangential guide surfaces, and oppositely disposed pawls carried by said hub coöperating with the surfaces of the slots in the sleeve, and with sockets in the periphery of the axle ends adapted to receive said pawls.

3. The combination with a two piece driving axle and its traction wheels thereon, of an elongated hub provided with a driving gear and extending over the adjoining ends of the axle pieces, a friction sleeve on the axle ends and a pin in each piece engaging a slot in the sleeve to limit the movement of the latter, and spring pressed pawls carried by the hub and engaging sockets in the axle pieces, said sleeve having open slots therein to co-act with said pawls, as described.

In testimony whereof I affix my signature.

WILLIAM WILSON.

Copies of this patent may be obtained for five cents each, by addressing the "Commissioner of Patents, Washington, D. C."